United States Patent [19]
Jinno et al.

[11] Patent Number: 6,163,310
[45] Date of Patent: Dec. 19, 2000

[54] DISPLAY APPARATUS WITH A BUILT-IN DRIVER

[75] Inventors: Yushi Jinno, Gifu; Kyoko Hirai, Hashima, both of Japan

[73] Assignee: Sanyo Electric Co. Ltd., Osaka, Japan

[21] Appl. No.: 09/162,835

[22] Filed: Sep. 29, 1998

[30] Foreign Application Priority Data

Oct. 3, 1997 [JP] Japan ................................. 9-270897

[51] Int. Cl.[7] ............................. G09G 3/36; G02F 1/1339
[52] U.S. Cl. .............................................. 345/87; 349/154
[58] Field of Search ........................................ 349/153, 154, 349/155, 156, 159, 189; 428/1.1; 345/87

[56] References Cited

U.S. PATENT DOCUMENTS

| | | | |
|---|---|---|---|
| 4,820,025 | 4/1989 | Nakanowatari | 349/154 |
| 5,105,290 | 4/1992 | Tomii et al. | 349/154 |
| 5,684,555 | 11/1997 | Shiba et al. | 349/154 |
| 5,798,813 | 8/1998 | Ohashi et al. | 349/154 |
| 5,936,695 | 8/1999 | Hida et al. | 349/153 |
| 5,969,784 | 10/1999 | Miyazaki et al. | 349/155 |

*Primary Examiner*—Richard A. Hjerpe
*Assistant Examiner*—M. Fatahiyar
*Attorney, Agent, or Firm*—Hogan & Hartson, LLP

[57] ABSTRACT

Gate lines and drain lines are arranged to cross each other on an inner surface of a substrate and display pixels are formed at individual intersections of these lines. For actuation of these elements, a drain driver, a gate driver, and a precharge driver are formed on the periphery of the substrate. Aluminum lines extend to respective circuits along the edge of the substrate from connecting terminals formed on the edge of the substrate. A sealing material is applied along the periphery of the substrate and an injection hole for liquid crystal is formed on one edge of the substrate. The drain driver is disposed on the edge opposite to the edge on which the injection hole is formed at a location as far from the injection hole as possible. Thus, the drain driver is distanced from the liquid crystal injection hole to prevent the failure of the display apparatus due to the fluctuation of a threshold value.

9 Claims, 5 Drawing Sheets

DISPLAY APPARATUS WITH A BUILT-IN DRIVER

BACKGROUND OF THE INVENTION

1. Field of the Invention

The present invention relates to a display apparatus with a built-in driver, in which a matrix of TFTs (thin film transistors) using a polycrystalline semiconductor layer are arranged on a display section and a driver formed by similar TFTs is also arranged on the periphery of the apparatus.

2. Description of the Related Art

Recently developed LCDs with a built-in driver include a matrix display section and peripheral drivers formed on the same substrate using a channel layer made of polysilicon (p-Si) in TFTs. The polysilicon film is fabricated by heating, fusing, and re-crystallizing a deposited amorphous silicon film by excimer laser annealing. The TFTs made of such polysilicon films are desirable elements for forming a driver, since such TFTs have a superior driving ability compared to other TFTs made of amorphous silicon.

FIG. 5 is a plan view showing an outlook of such an LCD panel. A display section 2 provided in the center of a substrate 1 includes gate lines (GL) and drain lines (DL) arranged in a matrix, and display pixels 3 are disposed at respective intersections of these lines, each display pixel consisting of a TFT, a pixel capacitor, and the like. A gate driver 4 and a drain driver 5 are disposed on the periphery of the display section 2 along the edge of the substrate 1, and electrode lines 7 extend to respective driver circuits for transmitting various signals from connecting terminals 6 arranged on one side of the substrate 1. A reference number 8 indicates a precharge driver for the drain lines (DL).

The above-mentioned substrate 1 consists of two substrates facing each other. Display pixels 3, the gate driver 4, the drain driver 5, and the like are arranged on one substrate on the side facing the other substrate. A color filter, a light shielding film, and the like are disposed on the other substrate on the side facing the one substrate. The two substrates are bonded together so as to leave a certain gap between the substrates by applying a sealing material 9 on the periphery of the substrate 1, whereby liquid crystal is sealed and kept in the gap. A portion of the sealing material 9 is left open to form an opening section 10 through which liquid crystal is injected to the interior of the substrate 1, as indicated by an arrow 11 in FIG. 5. After injection, a sealing material 12 is applied to seal the opening section 10.

The gate driver 4 and the drain driver 5 are formed by CMOS circuits made of TFTs, and formed integrally on the same substrate using p-si, as in the TFTs of the pixel section.

In such a case, however, upon injection of the liquid crystal into the substrate 1, changes of a threshold value Vt is large for the TFTs located in the vicinity of the injection hole 10 (indicated by a number 13 in FIG. 5) compared to other TFTs. This may cause a circuit operation failure and decrease a manufacturing yield of the display apparatus, if such TFTs are used in a high operating speed circuit, such as the drain driver 5.

The reason for this may be the accumulation of charge on the surface of an isolating film of the TFT induced by a very little amount of water or impurities contained in the liquid crystal material. Specifically, in the vicinity of the injection hole 10, the liquid crystal continues flowing after injection until it fills the substrate 1. As the amount of liquid crystal flowing over such TFTs increases, the amount of charge to be accumulated increases proportionally to form a back channel of the TFTs and largely change the threshold value Vt.

SUMMARY OF THE INVENTION

An object of the present invention is to prevent arLy failure caused by the fluctuation of a threshold value by changing the entire arrangement so that a drain driver is not located in an area ranging from an injection hole to display pixels.

DESCRIPTION OF PREFERRED EMBODIMENTS

An embodiment according to the present invention will be described in detail below.

Figure 1:
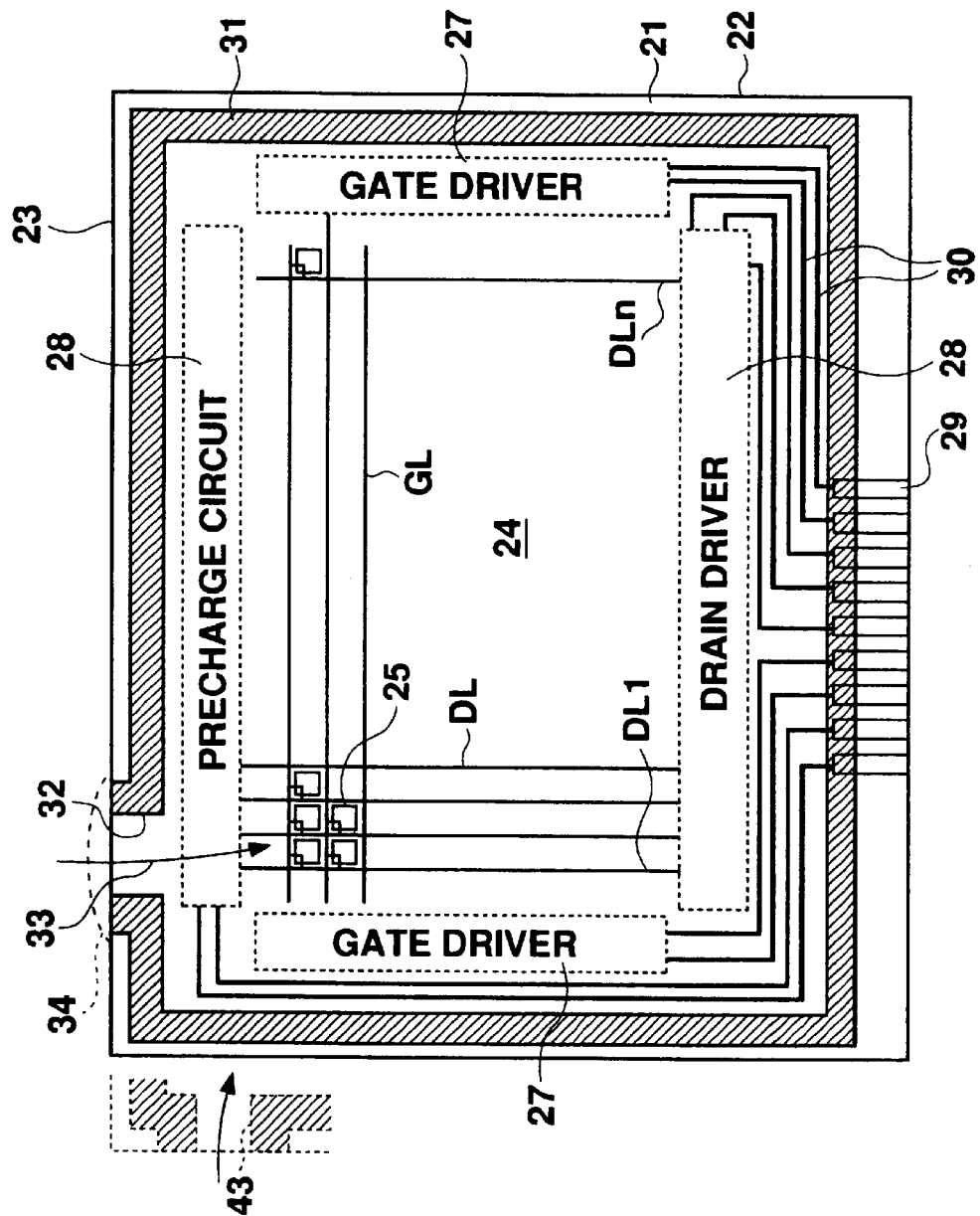
FIG. 1 is a plan view showing a liquid crystal display apparatus according to the present invention.

FIG. 1 is a plan view showing the structure of a liquid crystal display apparatus (an LCD panel) according to the present invention.

A substrate 21 is formed by two transparent substrates stacked one another across a gap, the substrates being made of quartz or a non-alkali glass of rectangular shape having a shorter edge (indicated by a number 22) and a longer edge (indicated by a number 23), typically in the size of 40 mm×54 mm. A display section 24 is provided in the center of the substrate 21 and includes a matrix of gate lines GL receiving a scan signal and drain lines DL receiving an original image signal (video signal), both lines being arranged at nearly the same pitch. At intersections of the gate lines GL and the drain lines DL, there are provided display pixels 25 formed by TFTs having an active layer made of a polysilicon semiconductor film, transparent display electrodes made of, for example, an ITO (indium-tin-oxide) film, auxiliary capacitors, and the like.

On the periphery of the substrate 21, or on an area surrounding the display section 24, a drain driver 26 formed by a CMOS circuit consisting of TFTs and various other control circuits (not shown) are disposed along one longer edge 23 of the substrate 21, while a gate drivers 27 formed by a similar CMOS circuit consisting of TFTs is disposed on both shorter edges located opposite to each other. A precharge driver 28 for precharging the drain lines DL is provided on the other longer edge 23 of the substrate 21. Connecting terminals 29 are also arranged on one longer edge 23 of the substrate 21, from which aluminum electrode lines 30 extend along the periphery of the substrate 21 for supplying various signals and a power supply voltage to respective driver circuits. The display pixels 25, the driver circuits 26, 27, and 28, the connecting terminals 29, the aluminum electrode lines 30, and the like are arranged on the one substrate on the side facing the other substrate. On the opposite side of the other substrate, color filters corresponding to R, G, and B, respectively, are arranged on positions corresponding to individual display electrodes of the display pixels 25. A black matrix (not shown) is provided in a region other than the region where the above color filters are provided to prevent leakage of the backlight (not shown) from the rear surface of the LCD panel.

To bond the one substrate having the above-mentioned TFTs formed thereon and the other substrate having the color filters and the like formed thereon, a sealing material 31 is applied in a strip of about 0.8 mm width along the periphery of the substrate 21 so as to leave a gap of about 3–8 am, for example, between the substrates. The sealing material 3 ends at one end of the longer edge 23 on which the precharge driver 28 is disposed, so that an opening section is formed between both substrates to serves as an injection hole 32 for injecting the liquid crystal. It is to be noted that the sealing material 31 may be applied on the aluminum lines 30.

The liquid crystal material is injected from the injection hole 32 into the gap between the two substrates of the substrate 21 bonded with the sealing material 31, as indicated by an arrow 33. After that, the injection hole 32 is covered by a sealing material 34 made of an epoxy resin to seal and hold the liquid crystal.

Figure 2:
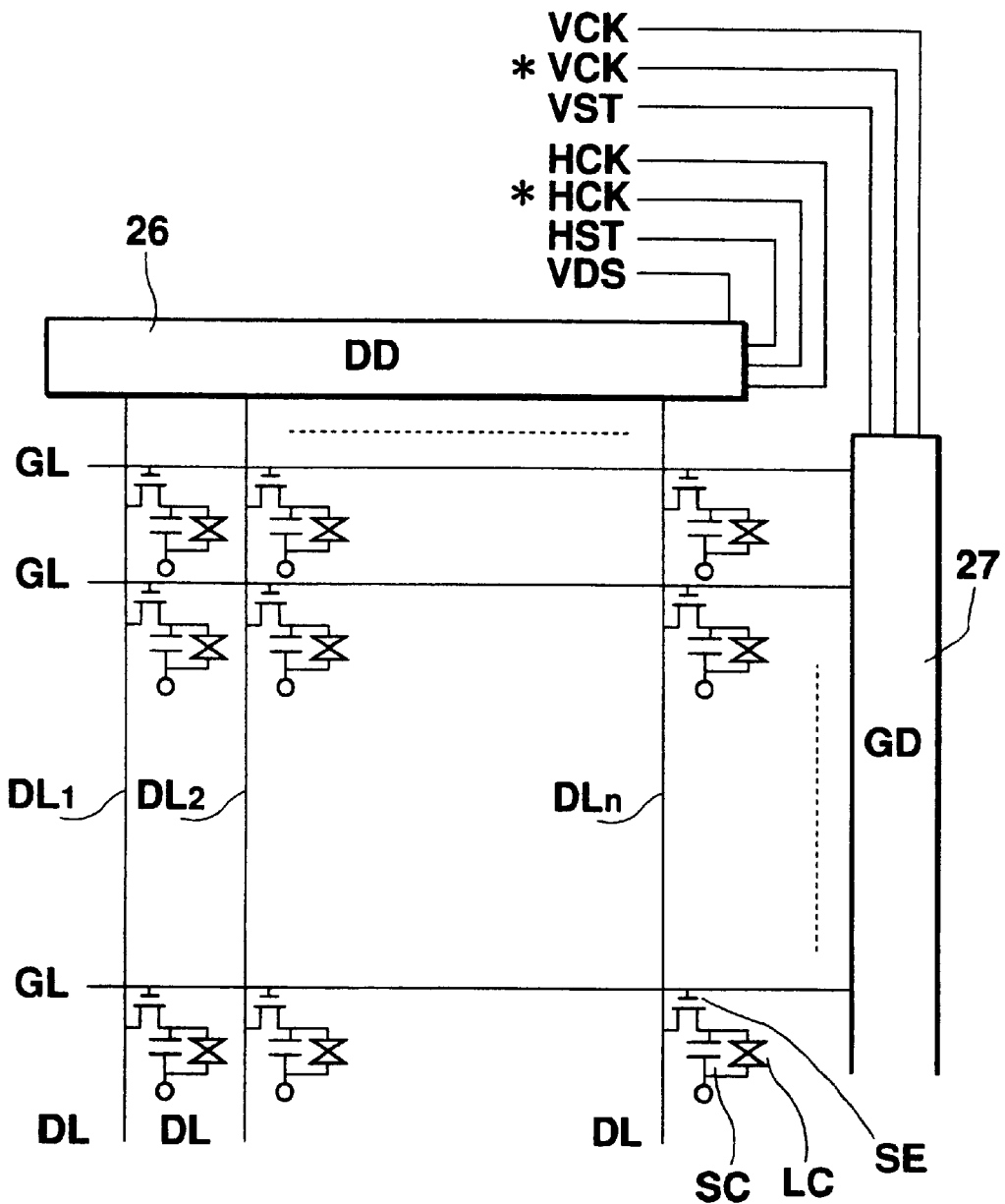
FIG. 2 is a circuit diagram showing the circuit structure of the liquid crystal display apparatus.

FIG. 2 is a circuit diagram showing the circuit structure of an LCD panel. A matrix circuit shown in the center of the drawing is a display section formed by a matrix of pixels. Gate lines GL are scanning lines arranged horizontally and drain lines DL are signal lines arranged vertically, and a TFTs (SE) is formed at each intersection of these lines. The TFT (SE) is connected to one electrode (a display electrode) of a pixel capacitor LC for actuating liquid crystal and also to one electrode of an auxiliary capacitor SC used for charge accumulation. The other electrode (an opposite electrode) of the pixel capacitor LC is formed by a common electrode provided on the entire surface of the other substrate located opposite to the one substrate across the liquid crystal layer. Namely, the pixel capacitor LC consists of the liquid crystal and the common electrode, both of which are partitioned by the individual display electrodes and connected to the switching TFTs (SE) to form the display pixels.

A gate driver 27 is disposed on the periphery of the display section for applying a voltage of a scan signal to the gate lines GL, and a drain driver 26 is also disposed on the periphery of the display section for applying a voltage of a pixel signal to the drain lines DL. The gate driver 27 is mainly formed by a vertical shift register which receives a vertical clock signal VCK and its inverted clock signal *VCK, and a vertical start pulse VST. The drain driver 26 is mainly formed by a horizontal shift register and a sampling transfer gate, to which a video signal VDS generated in an external integrated circuit, a horizontal clock signal HCK and its inverted clock signal *HCK, and a horizontal start pulse HST are supplied.

In response to the scan signal, the gate driver 27 selects one gate line GL to cause the TFT (SE) to turn on, and the drain driver 26 selects one drain line DL (accurately three lines at a time for R, G, and B in the case of a color LCD) to supply the video signal VDS to the pixel capacitor (LC) of the display pixel 25 w located at the intersection of the selected gate and drain lines. During selection, the drain driver 26 uses the horizontal shift register to sequentially selects the drain lines from the drain line DL1 located at one end of the display section 24 to the drain line DLn located at the opposite end thereof within a period 1H while one gate line (GL1) is selected. That is, if the display section 24 includes a total of n sets of drain lines DL, the time to select one drain line DL must be as brief as 1/n of the seconds to select one gate line GL. To achieve this, the drain driver 26 operates at a frequency of about two digits higher than the frequency of the gate driver 27, which makes the drain driver 26 to be especially vulnerable to changes of the threshold value Vt of the TFT.

The control circuits, which are not shown, may include a right and left switching circuit for inverting sides of an image to be displayed by switching a direction of the shift registering operation from the drain lines DL1 to DLn to from the drain lines DLn to DL1. If the threshold value Vt changes, as mentioned in the above section, in the right and left switching circuit, the image may be switched insufficiently. Therefore, this circuit should also be away from the injection hole 32 and disposed in the vicinity of the drain driver 26.

The precharge circuit 28 consists of a transfer gate and a buffer, and serves to reduce a writing noise of the drain lines by applying a given signal, which is similar to the video signal supplied to one end of the drain driver 26, to the drain line DL from the opposite end of the drain driver 26. This circuit improves definition of the display, but is not directly related to the pixel operation and has a high degree of tolerance against changes of the threshold value Vt. This allows the precharge circuit to be disposed in the vicinity of the injection hole 32, as this circuit does not present any unfavorable characteristics as in the drain driver 26.

Figure 3:
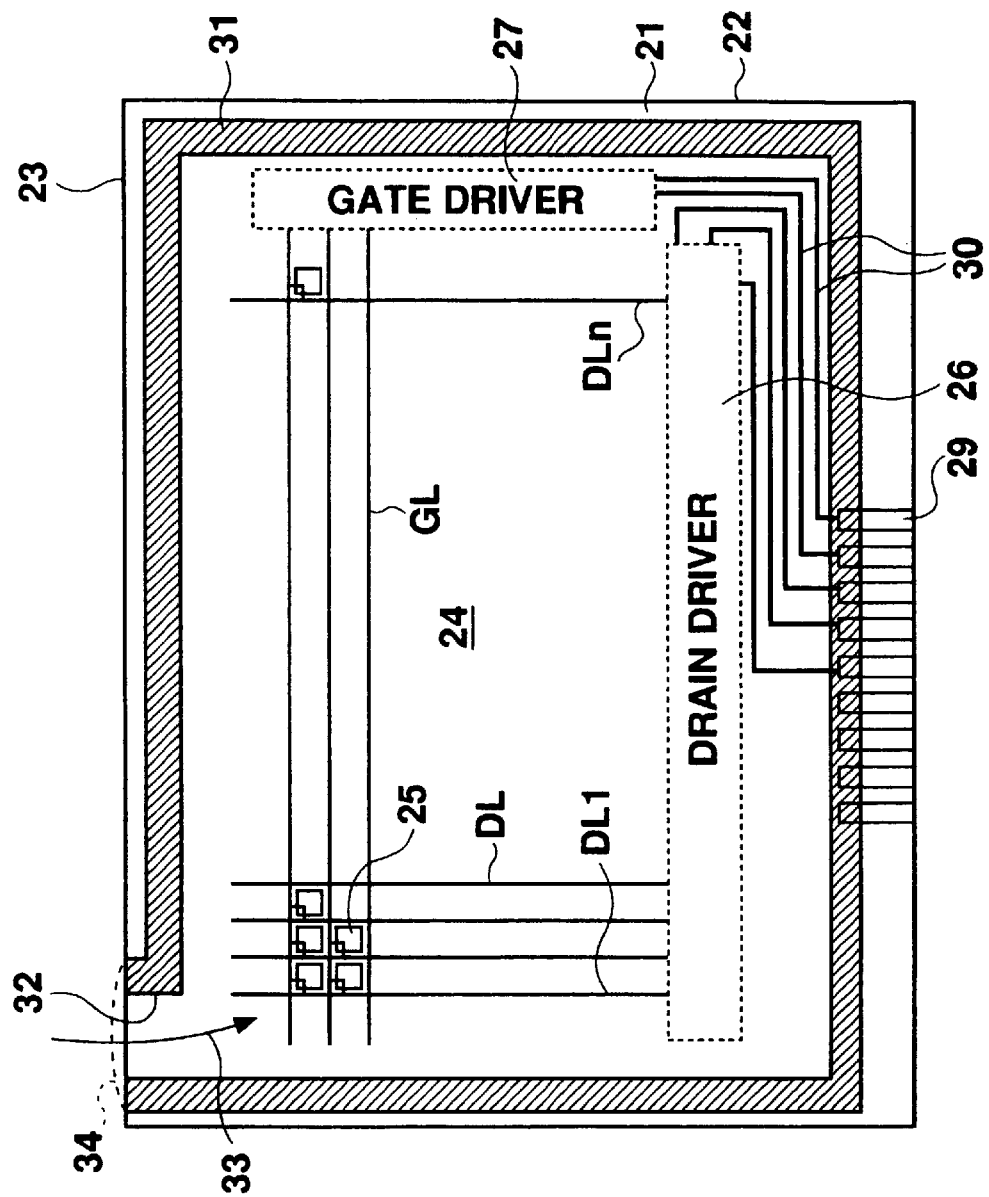
FIG. 3 is a plan view for explaining a second embodiment of the present invention.

FIG. 3 shows a second embodiment of the present invention, in which the same reference numerals are given to respective part corresponding to those of FIG. 1 and their description will not be repeated below. In the second embodiment, the precharge circuit 28 is omitted by taking into account the manufacturing cost and the definition of the display. Since the display pixels 25 are arranged in a matrix in the liquid crystal display apparatus with built-in drivers, at least the drain driver 26 and the gate driver 27 must be arranged on two orthogonal edges, respectively. In other words, peripheral drivers may not be disposed on the rest two edges. If such an unoccupied edge on which no peripheral devices are formed is present, the injection hole 32 is formed on that edge. In particular, if there are two unoccupied edges, the injection hole 32 is disposed in the vicinity of a corner where two unoccupied edges meet at right angles. Arranging the injection hole 32 on the unoccupied edge eliminates the operational failure, because there is no need to dispose any TFT elements which constitute the peripheral drivers in an area ranging from the injection hole 32 to the display pixel 25. It is noted that the display pixel 25 itself also has a high tolerance against changes of the threshold value Vt.

Figure 4:
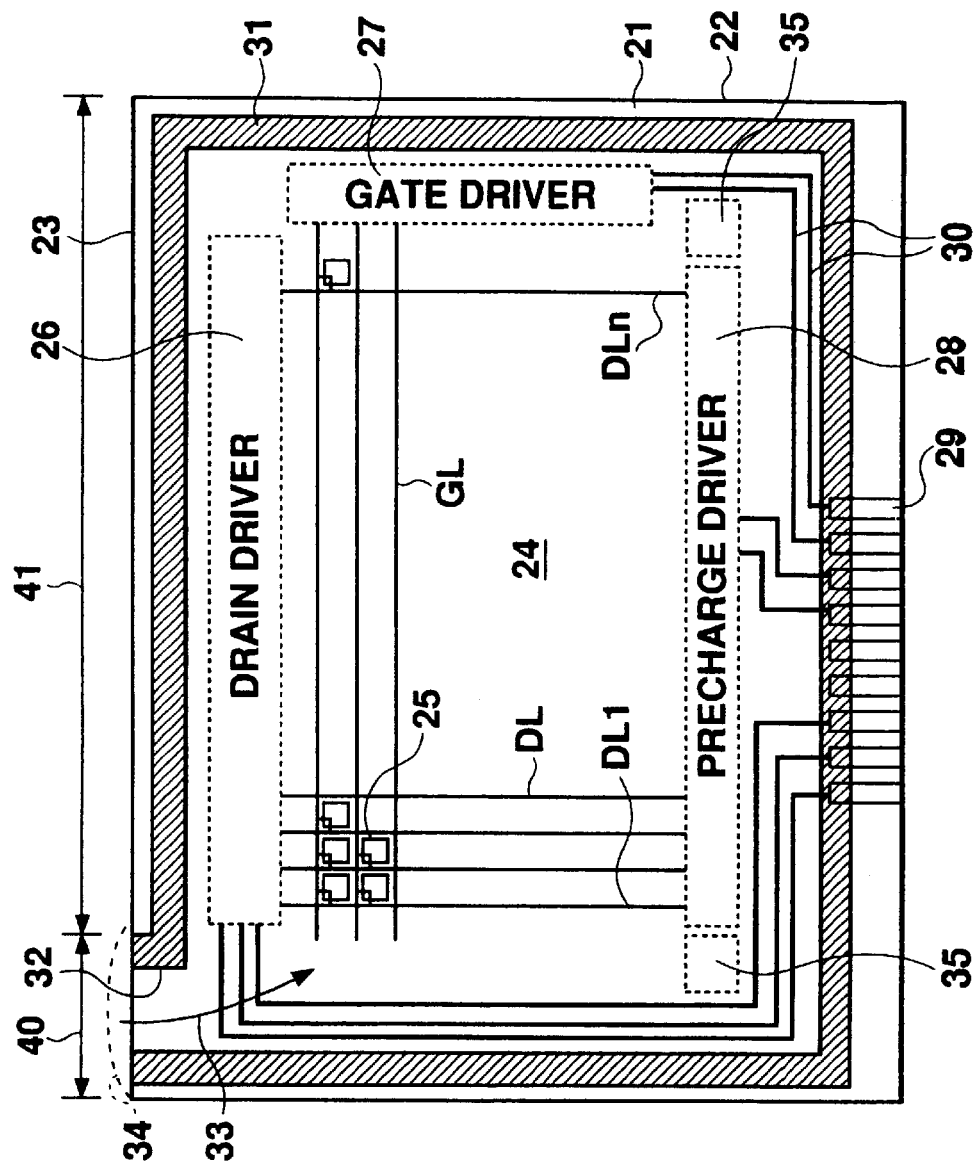
FIG. 4 is a plan view for explaining a third embodiment of the present invention.
Figure 5:
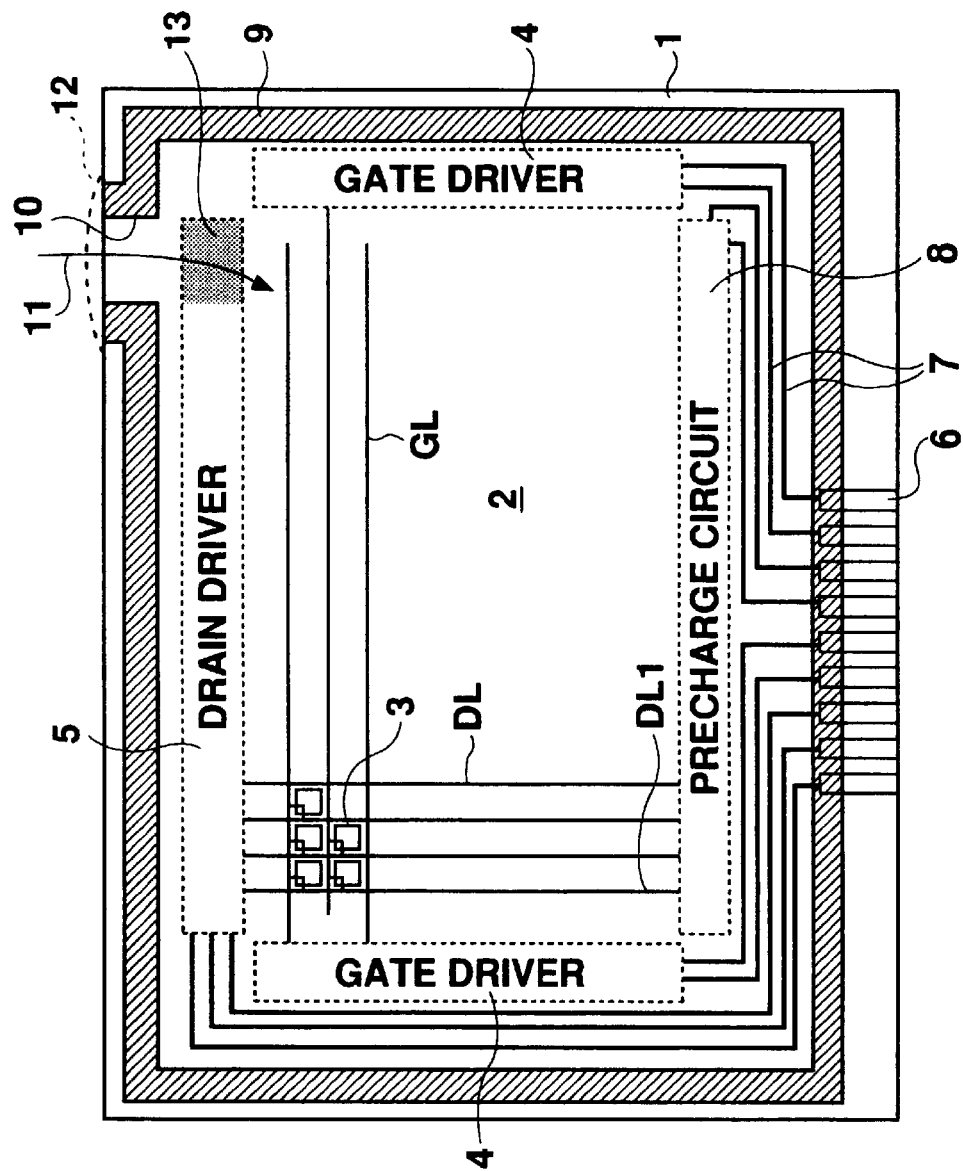
FIG. 5 is a plan view of a conventional liquid crystal apparatus.

FIG. 4 shows a third embodiment of the present invention, in which the same reference numerals are given to respective part corresponding to those of FIG. 1, and their description will not be repeated below. Unlike the first and second embodiments in which the drain driver 26 is disposed on the edge opposite to that where the injection hole 32 is formed, the drain driver 26 of the third embodiment is disposed on the same edge as the injection hole 32. It is to be noted, however, that the injection hole 32 is positioned as close to the corner as possible so that the liquid crystal injected from the hole 32 never straddles the drain driver 26. When a segment of the edge (indicated by a number 40) from one end of the edge to a point where the injection hole 32 ends is referred to as a first area, and another segment (indicated by a number 41) from the above-mentioned point to the other end of the edge is referred to as a second area, the drain driver 26 is located within the second area 41. Specifically, the end of the drain driver 26 is positioned at the farthest possible point from the injection hole 32 as long as the circuit pattern permits. In this arrangement, the injected liquid crystal runs around the side of the drain driver 26 to enter the display section 24 and does not directly pass over the drain driver 26 (as indicated by the arrow 33), which prevents an extreme fluctuation of the threshold value Vt of the TFT devices. In the drawing, a number 35 indicates the above-mentioned right and left switching circuit.

As described herein with respect to the embodiments, the present invention achieves the following advantages:

(1) The amount of liquid crystal running over the TFTs of the drain driver 26 is reduced by locating the drain driver 26 on the edge opposite to the edge on which the injection hole 32 for liquid crystal is formed. This also reduces the accumulation amount of impurities contained in the liquid crystal and trapped on the surface of an isolating film covering the TFTs. In addition, electrostatic charge accumulation is small at a section distanced from the injection hole 32, because of a lower flow rate of the liquid crystal than the flow rate in the vicinity of the injection hole 32 where a small sectional area causes a high flow rate. This prevents the formation of a back channel of TFTs of the drain driver 26 and also the fluctuation of the threshold value Vt.

(2) In the arrangement of FIGS. 1 and 3, the connecting terminals 29, the aluminum lines 30, and the drain driver 26 are disposed in this order from the outermost edge of the substrate 21. This arrangement allows the drain driver 26 to be located at a distance of, for example, more than 5 mm from the periphery of the substrate 21 without providing any unnecessary space. It has been found that a diameter of crystal particles in a silicon thin film crystallized by excimer laser annealing, which is one step of the TFT manufacturing process for crystallization of an amorphous silicon thin film acting as the TFT active layer into a polysilicon thin film, is less uniform at the periphery of the substrate 21 than in the vicinity of the center of the substrate 1. This further improves a manufacturing yield by disposing the drain driver 26, which is vulnerable to the fluctuation of characteristics of the TFT devices, at the closest possible location to the center of the substrate 21. This arrangement is also advantageous by considering that the braking (dividing) step of the substrate 21 is not carried out smoothly if the connecting terminals 29 and the injection hole 32 are arranged on the same side.

It is to be noted that the direction of the injection hole 32 is not limited to those shown in the FIGS. 1 and 3, and the result may be unchanged if the injection hole 32 is arranged (as indicated by a number 43) above the shorter edge 22 on which the gate driver 27 is disposed in FIG. 1.

As is apparent from the above description, the present invention achieves a significant reduction of the number of defective products caused by the fluctuation of the threshold value Vt of the TFTs of the drain driver 26, and also achieves the improvement of manufacturing yield of final products.

What is claimed is:

1. A display apparatus with a built-in driving circuit, comprising:

two isolating substrates arranged opposite to each other;

a plurality of gate lines and drain lines arranged to cross each other on one of said substrates on the side facing the other substrate;

a matrix of display pixels arranged at individual intersections of said gate lines and said drain lines;

a peripheral driving circuit arranged along the periphery of said one substrate on the side facing said the other substrate, and at least including a gate driver for actuating said gate lines and a drain driver for actuating said drain lines; and a sealing material applied between and along the periphery of said two substrates so as to surround a display section;

wherein an injection hole is formed at a portion of said sealing material for injecting liquid crystal into a space between said two substrates and, subsequently, sealing the liquid crystal, and wherein at least said drain driver is not disposed in an area ranging from said injection hole to said display section.

2. A display apparatus with a built-in driving circuit, comprising:

two isolating substrates arranged opposite to each other;

a plurality of gate lines and drain lines arranged to cross each other on one of said substrates on the side facing the other substrate;

a matrix of display pixels arranged at individual intersections of said gate lines and said drain lines;

a peripheral driving circuit arranged along the periphery of said one substrate on the side facing said the other substrate, and at least including a gate driver for actuating said gate lines and a drain driver for actuating said drain lines; and a sealing material applied between and along the periphery of said two substrates so as to surround a display section;

wherein an injection hole is formed at a portion of said sealing material for injecting liquid crystal into a space between said two substrates and, subsequently, sealing the liquid crystal, and wherein said substrates have a rectangle shape, whereby said injection hole is formed on one edge of said rectangle, and said drain driver is disposed on the edge opposite to the edge on which said injection hole is formed.

3. The display apparatus with a built-in driving circuit according to claim 2, wherein a precharge circuit is disposed on the edge on which said injection hole is formed.

4. The display apparatus with a built-in driving circuit according to claim 2, wherein said gate driver is disposed at least on one edge adjacent to the edge on which said injection hole is formed.

5. The display apparatus with a built-in driving circuit according to claim 2, wherein at least one edge of said rectangle is left unoccupied by any said peripheral circuit, and said injection hole is formed on said unoccupied edge.

6. The display apparatus with a built-in driving circuit according to claim 2, wherein said injection hole is formed in the vicinity of a corner section where at least two adjacent edges of said rectangle meet, both of said two edges being unoccupied by any said peripheral circuit.

7. The display apparatus with a built-in driving circuit according to claim 2, wherein said drain driver is distanced from an external connecting terminal formed at an outermost edge of said substrates via a line extending to said peripheral circuit.

8. A display apparatus with a built-in driving circuit, comprising:

two isolating substrates arranged opposite to each other;

a plurality of gate lines and drain lines arranged to cross each other on one of said substrates on the side facing the other substrate;

a matrix of display pixels arranged at individual intersections of said gate lines and said drain lines;

a peripheral driving circuit arranged along the periphery of said one substrate on the side facing said the other substrate, and at least including a gate driver for actuating said gate lines and a drain driver for actuating said drain lines; and a sealing material applied between and along the periphery of said two substrates so as to surround a display section;

wherein an injection hole is formed at a portion of said sealing material for injecting liquid crystal into a space between said two substrates and, subsequently, sealing the liquid crystal, and wherein said substrates have a rectangle shape, whereby said injection hole is formed on one edge of said rectangles and said drain driver is disposed on one of the other edges of said rectangle on which no said injection hole is formed.

9. The display apparatus with a built-in driving circuit according to claim 8, wherein said injection hole is formed close to one end of said edge and said drain driver is disposed on the other end thereof.

* * * * *